115,013

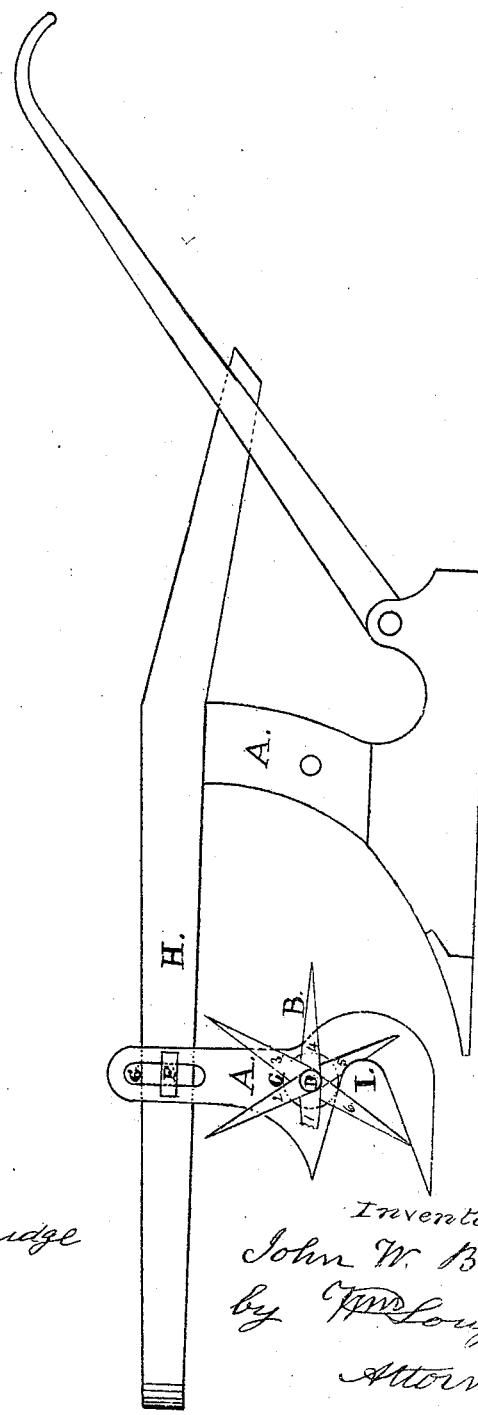

UNITED STATES PATENT OFFICE.

JOHN W. BAKER, OF ELKTON, MARYLAND.

IMPROVEMENT IN ROOT-CUTTERS FOR PLOWS.

Specification forming part of Letters Patent No. 115,013, dated May 23, 1871.

I, JOHN W. BAKER, of the town of Elkton, county of Cecil and State of Maryland, have invented certain Improvements in Cutting Roots and other debris that obstruct the cultivation of land.

The nature of my invention consists in an improvement on the invention of Isaac Eastwood, patented October 11, 1870, for the purpose of cutting roots and other obstructions that interfere with plowing when found upon or under the surface of the ground. The first part of my invention consists in giving the colter which forms one part of the shears a sickle-shape opening, so that the obstructions shall be gathered into the shears from above and under the ground, and conveyed in inclined or curved lines near the axis of the radial arms, so as to afford greater leverage for cutting them asunder.

Figure 1 is a side elevation of a plow having my invention attached to its beam, which is represented by a section only of the beam.

A represents the cutter-bar or colter, which may be fastened at A' if desired. B represents six revolving knives, which are fixed to the hub G that revolves on the axis D and fulcrates or pivots in the cutter-bar A. The cutter or half of the shears is fixed to the plow-beam H with the screw-bolt F, and by means of the slot G the plowman can raise the shears or lower them at pleasure.

When the plow moves forward the outer points of the revolving shears B enter the ground and become fixed until the approaching cutter-bar severs the roots, &c., as desired.

I claim—

The sickle-shaped opening I, when combined with the revolving cutters B, when constructed in the manner and for the purposes substantially as set forth.

JOHN W. BAKER.

Witnesses:
WM. LOUGHRIDGE,
W. H. WALSH.